United States Patent
Fujimoto et al.

(10) Patent No.: US 9,467,062 B2
(45) Date of Patent: Oct. 11, 2016

(54) CAPACITOR INPUT TYPE SMOOTHING CIRCUIT

(71) Applicants: Heiwa Inc., Kawaguchi-shi (JP); HayterzLab. Inc., Soka (JP)

(72) Inventors: Toyotsugu Fujimoto, Soka (JP); Akihisa Hiromachi, Kawaguchi (JP)

(73) Assignees: HEIWA INC., Kawaguchi-Shi (JP); HAYTERZLAB, INC., Soka-Shi (JP)

( * ) Notice: Subject to any disclaimer, the term of this patent is extended or adjusted under 35 U.S.C. 154(b) by 253 days.

(21) Appl. No.: 14/378,390

(22) PCT Filed: Jan. 30, 2014

(86) PCT No.: PCT/JP2014/052122
§ 371 (c)(1),
(2) Date: Aug. 13, 2014

(87) PCT Pub. No.: WO2015/114780
PCT Pub. Date: Aug. 6, 2015

(65) Prior Publication Data
US 2016/0204715 A1    Jul. 14, 2016

(51) Int. Cl.
*H02M 3/155* (2006.01)
*H02M 7/217* (2006.01)
*H02M 3/156* (2006.01)
*H02M 1/15* (2006.01)

(52) U.S. Cl.
CPC .......... *H02M 7/2176* (2013.01); *H02M 3/155* (2013.01); *H02M 3/156* (2013.01); *H02M 1/15* (2013.01)

(58) Field of Classification Search
None
See application file for complete search history.

(56) References Cited

U.S. PATENT DOCUMENTS

| | | | |
|---|---|---|---|
| 6,998,786 B2* | 2/2006 | Chiou | H05B 41/2855 315/119 |
| 2010/0118576 A1* | 5/2010 | Osaka | H02M 1/4225 363/126 |
| 2011/0234176 A1* | 9/2011 | Nakamura | H02M 1/08 320/166 |
| 2015/0305102 A1* | 10/2015 | Yu | H05B 33/0851 315/200 R |

FOREIGN PATENT DOCUMENTS

| | | |
|---|---|---|
| JP | 2005-019266 A | 1/2005 |
| JP | 2013-143122 A | 7/2013 |

* cited by examiner

*Primary Examiner* — Jeffrey Gblende
(74) *Attorney, Agent, or Firm* — Jacobson Holman, PLLC.

(57) ABSTRACT

A pulsating circuit suppling a pulsating voltage to a load when a capacitor is not discharged, and a control circuit which controls discharging the capacitor. The control circuit includes a smoothing circuit, and a voltage detection circuit. The voltage detection circuit includes a first switch that is turned off by detecting the pulsating voltage is in a voltage range; a second switch connected to the first switch and is turned on when the first switch is turned off; and a third switch connected to the second switch and is turned on when the second switch is turned on When the pulsating voltage is not in the discharge voltage range of the capacitor, the first switch is turned on and the second and third switches are turned off. A discharge voltage of the capacitor is set within a range that is slightly higher than a lower limit of a voltage.

3 Claims, 4 Drawing Sheets

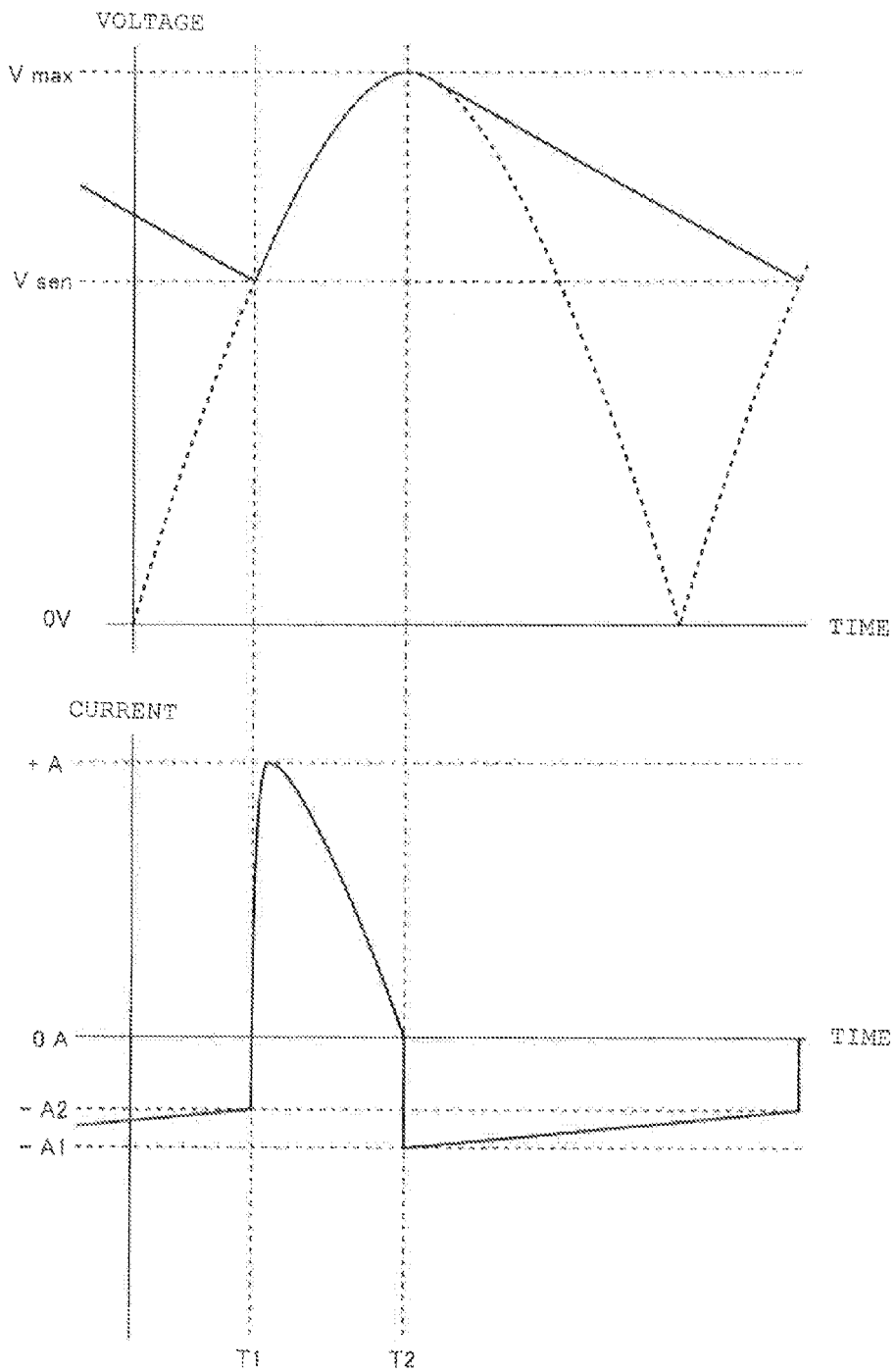

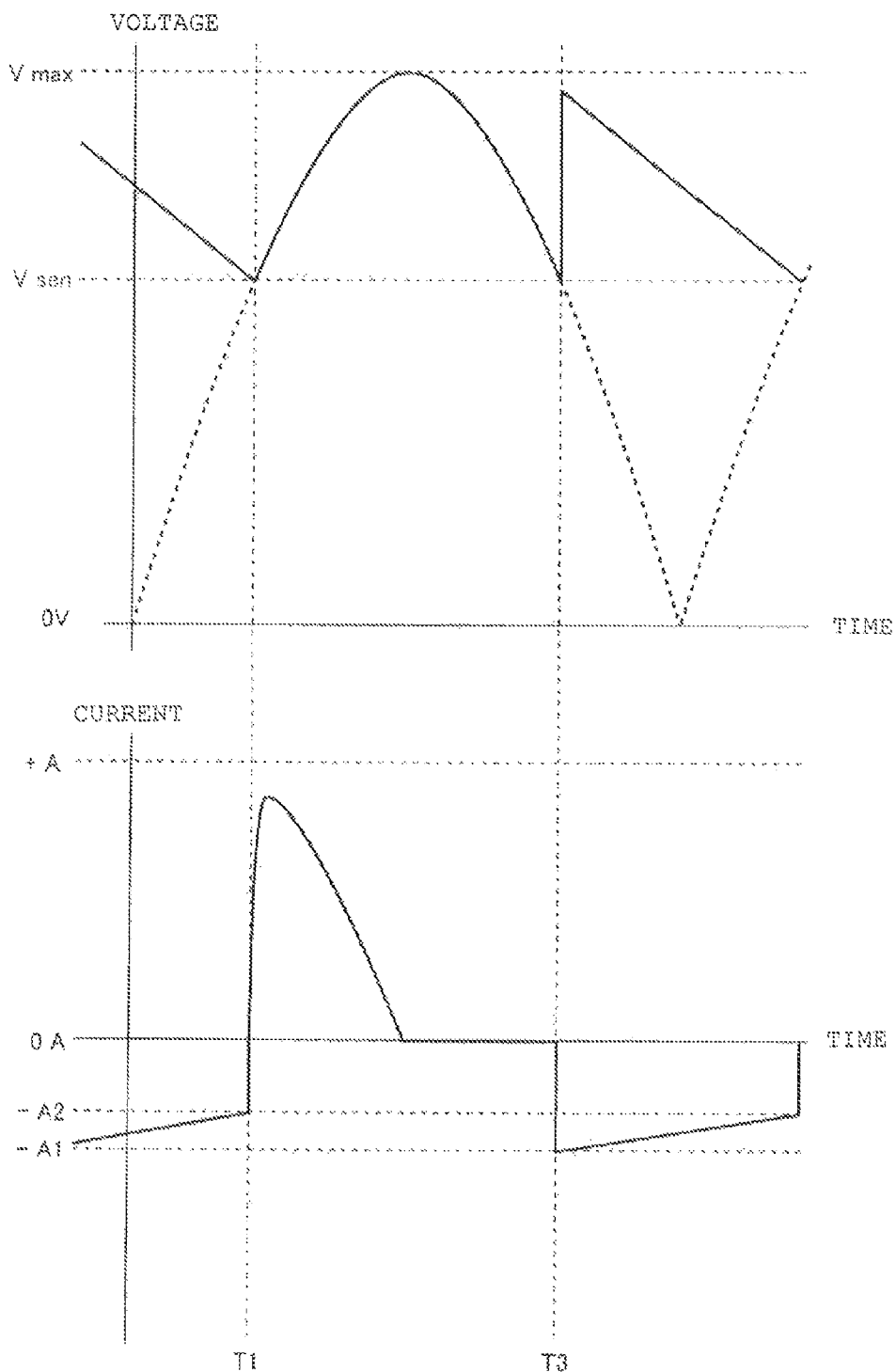

CAPACITOR INPUT TYPE SMOOTHING CIRCUIT

TECHNICAL FIELD

The present invention relates to a capacitor input type smoothing circuit for shaping the pulsating current formed when converting AC current to DC current.

BACKGROUND ART

In order to convert AC current to DC current of arbitrary voltage, it is necessary to perform rectification or step-up and step-down using certain methods. Since a pulsating current is obtained in the conversion described above, it is also necessary to smooth the pulsating current in order to have a smoother waveform in a bad case.

A simple smoothing method that has been used for a long time is a method of using an electrolytic capacitor having a large capacity after rectification. By causing the capacitor to be charged and discharged, a portion of the valley of the pulsating current is covered by the discharging from the capacitor.

The recent years, a power factor correction circuit using a switching technique has been used. This mainly controls a current flowing through the coil by switching. In a so-called capacitor input, type or condenser input type smoothing circuit that uses an electrolytic capacitor having a large capacity, charging until the voltage of the pulsating current reaches the apex and discharging when the pulsating voltage is reduced thereafter are repeated.

However, since discharging occurs immediately after charging, electric power of the capacitor is applied in a time zone in which the voltage drops from the apex of the voltage of the pulsating current. This is not the electric power from the AC power supply but is reactive power. A reduction in the power factor causes many problems, such as the generation of harmonics. This becomes a burden on the power transmission and distribution side. When harmonic current flows excessively through the power line, a problem, such as burnout of a condenser inserted in the power line, occurs in the worst case.

As a power factor correction circuit, there is a circuit abbreviated as PFC. However, this circuit is complicated, and power loss due to switching also occurs since the switching is accompanied. In addition, there is also a disadvantage in that switching noise is easily transmitted through the power supply line.

Thus, since a capacitor input type is simple, the number of components is small and the cost is low. On the other hand, there is a power factor problem. The power factor can be improved by the PFC circuit, but a complicated circuit configuration is required and accordingly the cost is high. In addition, a circuit for suppressing noise is also required.

In addition, related technologies were investigated, but any related technology corresponding to the so-called prior art was not found. For example, there is an invention disclosed in JP-A-2005-19266 that uses a PFC circuit. The invention includes a transformer having a power transformation function and a PFC control unit that causes the transformer to perform the transformation of DC power by the on/off control of a switching element in order to suppress a harmonic current. However, there is almost no relationship with the present invention.

[Patent Citation] JP-A-2005-19266

DISCLOSURE OF INVENTION

Technical Problem

The present invention has been made in view of the circumstances described above, and it is an object of the present invention to embody a capacitor input type smoothing circuit capable of suppressing electric power at the time of charging without reducing the power factor if possible. In addition, it is another object of the present invention to obtain a configuration, which can be realized as easily as possible, with a small number of components, and accordingly, to realize a significant cost reduction.

Technical Solution

In order to solve the aforementioned problem, the present invention includes a pulsating circuit that supplies a pulsating voltage to a load when a capacitor is not discharged and a control circuit that controls discharging of the capacitor. The control circuit includes a smoothing circuit, which is connected in parallel to the pulsating circuit, and a voltage detection circuit for detecting the voltage. The voltage detection circuit determines a voltage range to discharge the capacitor, and includes a first switch that is turned off by detecting that the pulsating voltage is in the voltage range, a second switch that is connected to the first switch and is turned on when the first switch is turned off, and a third switch that is connected to the second switch and is turned on when the second switch is turned on. When the pulsating voltage is not in the discharge voltage range of the capacitor, the first switch is turned on and the second and third switches are turned off so that capacitor power is not supplied to the load. A discharge voltage of the capacitor is set within a range that is slightly higher than a lower limit of a voltage that the load requires and is not equal to or greater than the voltage.

The basic configuration of the present invention is a general capacitor input type smoothing circuit. In addition, a control circuit for controlling the discharging of the capacitor is included, and the control circuit includes a smoothing circuit connected in parallel to the pulsating circuit and a voltage detection circuit for detecting the voltage.

The voltage detection circuit determines a voltage range to discharge the capacitor, and includes a first switch that is turned off by detecting that the pulsating voltage is in the voltage range, a second switch that is connected to the first switch and is turned on when the first switch is turned off, and a third switch that is connected to the second switch and is turned on when the second switch is turned on.

When the pulsating voltage is not in the discharge voltage range of the capacitor, the first switch is turned on and the second and third switches are turned off so that the capacitor power is not supplied to the load. The discharge voltage of the capacitor is set within a range that is slightly higher than the lower limit of a voltage that the load requires and is not equal to or greater than the voltage.

More specifically, a capacitor input type smoothing circuit of the present invention includes a bridge circuit connected to an AC power supply and a power line connected to an output end of the bridge circuit. The power line is branched into three lines to supply rectified electric power directly to a capacitor input circuit, a voltage detection circuit, and a load. A first branch line is used to supply electric power directly to the load when the capacitor is not discharged. A second branch line is used to supply electric power to the capacitor when a supplied pulsating to rises so that the capacitor is charged. A third branch line is used to divide the supplied pulsating voltage and supply the divided voltage to a voltage detection circuit. A backflow prevention element is disposed in the first branch in leading to the load and the second branch line leading to the capacitor. A voltage detection circuit that determines and detects a voltage range to discharge the capacitor is provided in the remaining third branch line. The voltage detection circuit determines a voltage range to discharge the capacitor, and includes a first switch that is turned off by detecting that the pulsating voltage is in the voltage range, a second switch that is connected to the first switch and is turned on when the first switch is turned off, and a third switch that is connected to the second switch, and is turned on when the second switch is turned on. A discharge voltage of the capacitor is set so that the pulsating voltage matches an operating base voltage of the first switch.

In the present invention, electric power is mainly supplied from the commercial AC power supply and is rectified by the bridge circuit, and electric power is divided into three parts of the pulsating circuit flowing directly to the load, the circuit having a capacitor, and the voltage detection circuit. The pulsating circuit is connected to the first branch line, the circuit having a capacitor is connected to the second branch line, and the voltage detection circuit is connected to the third branch line.

The first branch line is used to supply electric power directly to the load when the capacitor is not discharged. The second branch line is used to supply electric power to the capacitor when a supplied pulsating voltage rises so that the capacitor is charged. A third branch line is used to divide the supplied pulsating voltage and supply the divided voltage to the voltage detection circuit.

By the first branch line to the load, electric power is directly supplied to the load when the capacitor of the circuit of the present invention is not discharged. The capacitor is charged when the voltage of the supplied pulsating current rises.

The voltage detection circuit determines a voltage range to discharge the capacitor, and includes a first switch that is turned off by detecting that the pulsating voltage is in the voltage range, a second switch that is connected to the first switch and is turned on when the first switch is turned off, and a third switch that is connected to the second switch and is turned on when the second switch is turned on.

In addition, when the voltage detection circuit detects a voltage range where the capacitor is charged but no electric power is supplied from the capacitor to the load, an electronic switch 1 is turned on, and an electronic switch 2 connected thereto is turned off. In addition, an electronic switch 3 connected to the electronic switch 2 is also turned off, and no electric power is supplied from the capacitor to the load.

Preferably, the voltage range to discharge the capacitor is set within a range that is slightly higher than the lower limit of a voltage that the load requires and is lower than the voltage. Simply, it is possible to use a method of matching the pulsating voltage to the operating base voltage of the transistor using a dividing resistor or the like, for example.

Advantageous Effects

According to the present invention, electric power in a time zone in which the pulsating voltage drops is not supplied from the power line. Even in the time zone in which the pulsating voltage drops, the supply of electric power from the capacitor to the load is stopped by the voltage detection circuit of the present invention and the control circuit, and electric power is supplied from the power line to the load through the bypassed third branch line. Accordingly, a problem that the power factor is lowered is solved. That is, a problem, which is a disadvantage of a simple capacitor input method, is solved in which, once the voltage of the pulsating current starts to drop, the capacitor starts to be discharged and electric power in the time zone in which the pulsating voltage drops is no longer supplied from the power line, and accordingly, the power factor is lowered.

In addition, by setting the voltage detection circuit provided in the second branch line so that electric power is supplied from the capacitor to the load immediately before reaching the lower limit of the voltage that the load requires, discharge time is minimized. Accordingly, it is possible to adopt a smaller capacitor. Thus, the effect of suppressing the electric power at the time of charging is also obtained.

Even in the time one of a valley of the pulsating current, discharging of the capacitor starts from a voltage obtained by subtracting the loss from the maximum voltage at the time of charging in the circuit of the present invention. This is useful since power is present. Switching between electric power from the power line of the first branch line and electric power from the capacitor of the second branch line occurs only twice during one period of the pulsating current. Accordingly, noise and loss due to the switching are minimized In particular, since the present invention can be configured very simply, the number of components is small, and no expensive components are required. Therefore, it is possible to significantly reduce the cost compared with a power factor correction circuit that has been conventionally common. In addition, by setting the discharge voltage of the capacitor in a range that is not equal to or greater than the lower limit of the voltage that the load requires, the valley of the pulsating current can be covered with a smaller amount of charging than a typical capacitor. Therefore, the capacitance of the capacitor itself can be further reduced, and the power factor is further improved since the current is low.

BEST MODE FOR CARRYING OUT THE INVENTION

Hereinafter, a capacitor input type smoothing circuit 10 of the present invention will be described in detail with reference to an embodiment shown in the diagrams. FIG. 1 is an example 1 in which rectified electric power is supplied through a bridge circuit 12, which is formed by diodes, from a commercial AC power line that is an AC power supply 11. Since this has not been smoothed, this is a DC current, but becomes to pulsating current having a rising voltage (refer to FIGS. 2 and 3).

The pulsating current has the bridge circuit 12 connected to the AC power supply 11 and a power line 13 connected to the output end of the bridge circuit 12, and the power line 13 is branched into three lines of pulsating circuit 1 to supply the rectified electric power directly to a load, a smoothing circuit (or a capacitor input circuit) 15, and a voltage detection circuit 16.

The smoothing circuit or the capacitor input circuit) 15 and the voltage detection circuit 16 form a control circuit A1 that controls the discharging of the capacitor. On the upstream side of the capacitor connection point of the pulsating circuit 14 and the circuit 15 leading to a load B, diodes are inserted as backflow prevention elements D1 and D2.

Among the three branch lines, the first branch line is connected to the pulsating circuit 14 that flows directly to the load through the diode D1. The second branch line is connected to the smoothing circuit 15 that flows to a capacitor C1 through the diode D2. The third branch line is connected to the voltage detection circuit 16 that is voltage-divided through resistors R1, R2, and inserted in series in the same order.

In the first branch line, when the capacitor C1 is not discharged, electric power is directly supplied to the load B from the power line. In the second branch line, the capacitor C1 charged when the voltage of the supplied pulsating current rises. In the third branch line, the voltage of the supplied pulsating current is divided by three resistors.

The divided voltage between the combined resistance of the resistors R2 and R3 and the resistor R1 is used to drive a base of a transistor Tr2 that is a second switch 18. The divided voltage between the combined resistance of the resistors R1 and R2 and the resistor R3 is set such that the discharging of the capacitor C1 is stopped when reaching a base voltage of Tr1 that is a first switch 17.

Resistors R5 and R6 are for generating an appropriate voltage for driving FET1 that is a third switch 19. The resistor R6 is inserted in a circuit connecting the second and third switches 18 and 19 to each other, and the resistor R5 is inserted between the third switch 19 and the capacitor C1 of the smoothing circuit 15 and between the resistor R6 and the third switch 19.

In the case illustrated, a field effect transistor (FET) is used as the third switch 19, and the FET1 is Pch (P channel type). Therefore, a current flows through the resistor R6 from the gate at the time of power application. Since the FET can be driven with a small amount of current in general, there is no burden on the transistor Tr2. Therefore, the resistor R6 should be set such that too much current does not flow.

As described above, D1, D2, and D3 indicate diodes for backflow prevention. The diodes D1 and D2 are necessary to avoid detecting inappropriate voltages due to backflow power from the capacitor C1 at the time of voltage detection of electric power from the power line by resistors R1, R2, and R3. The diode D3 is inserted in order to prevent electric power passing through the diode D1 from flowing to the capacitor C1 through a damage prevention diode built in the FET1. It should be remembered that a large amount of current cannot flow through the damage prevention diode.

When a voltage supplied from the commercial AC power line is AC 210 V, a DC voltage corresponding thereto is 296 V. Assuming that the resistor R1 is 2.2 MΩ, the resistor R2 is 260 KΩ, the resistor R3 is 14 KΩ, and the resistor R4 is 260 KΩ, the base voltage of the transistor Tr1 becomes about 0.56 V at around 180 V. The transistor Tr1 is turned on and off with this voltage as a boundary.

Therefore, the above can be calculated as follows.

(Combined resistance) 274 KΩ=(R2) 260 KΩ+(R3) 14 KΩ, (Combined resistance) 133 KΩ=parallel of 133 KΩ=(R2+R3) 274 KΩ and (R4) 260 KΩ, (Combined resistance) 2333 KΩ=(R1) 2200 KΩ+133 KΩ.

When the voltage is 180 V, a current flowing through the resistor R1 is about 80 μA/2333 KΩ, A current of about 40 μA that is approximately half of 80 μA flows through the resistors R2 and R4.

A current of about 40 μA also flows through the resistor R3, and the base voltage of the transistor Tr1 becomes about 0.56 V=14 KΩ×40 μA.

In a capacitor input type smoothing circuit 10 of the present invention having such a configuration, when the transistor Tr1 is turned on the collector voltage of the transistor Tr1 drops, and the base voltage of the transistor Tr2 connected thereto drops. Then, the transistor Tr2 is turned off. When the transistor Tr2 is turned off, the voltage of the gate of the Pch FET1 connected to the collector of the transistor Tr2 does not become a negative potential, and the FET1 is turned off. Accordingly, discharging from the capacitor C1 to the load B does not occur.

When the transistor Tr1 is turned off, the collector voltage of the transistor Tr1 rises, and the base voltage of the transistor Tr2 connected thereto also rises. Then, the transistor Tr2 is turned on. When the transistor Tr2 is turned on, the voltage of the gate of the Pch FET1 connected to the collector of the transistor Tr2 becomes a negative potential, and the FET1 is turned on. Accordingly, discharging from the capacitor C1 to the load B occurs.

In the example 1, the transistor Tr2 is to be turned off near the pulsating voltage of 0 V. In practice, however, since there is also a small amount of capacitance in the base of the transistor as in the FET, the transistor Tr2 is turned on by the remaining electric power. The field effect transistor FET1 of the third switch is turned on even with a weak current. Therefore, no de facto problem is caused even if the transistor Tr2 of the second switch is semi-open.

However, since the completeness of the operation is also important, it is possible to adopt a configuration shown in FIG. 2 for the case. In a smoothing circuit of example 2 according to the present invention shown in FIG. 2, a capacitor C2 having an appropriate capacity is additionally connected to the collector of the transistor Tr1 and the base of the transistor Tr2, so that current application is ensured. Thus, it is possible to hold the conduction of the transistor Tr2 near the pulsating voltage of 0 V. In addition, since the other configuration of Example 2 including a control circuit A2 is the same as Example 1, detailed explanation thereof will be omitted.

FIG. 3 shows an input voltage from the power line, a voltage applied to the load, and the amount of charge and discharge of the current the capacitor C1 at the time of smoothing using a conventional simple capacitor input method together with the time axis. In FIG. 3, a voltage is shown in an upper part, and a current is shown in a lower part. When the voltage of the pulsating current from the power line reaches Vsen, a current flows into the capacitor C1. As a result, the capacitor C1 is charged. The charging continues until the voltage of the pulsating current reaches an apex Vmax. At the same time, electric power is supplied from the power line to the load. Then, when the voltage of the pulsating current starts to drop from Vmax, a current is discharged from the capacitor C1. As a result, the capacitor C1 is discharged. At the same time, electric power is supplied from the capacitor C1 to the load. Electric power is supplied from the power line from T1 to T2 and from the capacitor C1 in the other time zone. When the voltage of the pulsating current from the power line falls, electric power is not used to become a reactive power even though the voltage is still high. Therefore, it can be seen that the power factor is low in this case.

FIG. 4 shows an input voltage from the power line, a voltage applied to the load, and the amount of charge and discharge of the current of the capacitor C1 in the capacitor input type smoothing circuit 10 of the present invention together with the time axis. In FIG. 4, a voltage is shown in an upper part, and a current is shown in a lower part. When the voltage of the pulsating current from the power line reaches Vsen, a current flows into the capacitor C1. As a result, the capacitor C1 is charged. The charging continues until the voltage of the pulsating current reaches the apex Vmax. At the same time, electric power is supplied from the power line to the load. This is the same as in the simple capacitor input method. In addition, current is described as a positive value when a capacitor is charged and as a negative value when a capacitor is discharged.

Then, even if the voltage of the pulsating current starts to drop from Vmax, no current is discharged from the capacitor C1. This is because the capacitor input type smoothing circuit 10 of the present invention is set such that discharging from the capacitor C1 does not occur when the pulsating current has a higher voltage than Vsen. At the same time, electric power is supplied from the power line to the load B. Then, when the voltage of the pulsating current is less than Vsen, the electronic switch FET1 is turned on. As a result, electric power is supplied from the capacitor to the load. At the same time, the voltage applied to the load B gradually drops from a value obtained by subtracting the loss from the maximum voltage VMax that the capacitor C1 receives at the time of charging.

Electric power is supplied from the power line from T1 to T3 and from the capacitor C1 in the other time zone. Electric power is supplied from the power line in a range above the lower limit Vsen of the voltage that the load B requires. The fact that the load B uses electric power from the capacitor C1 in a time zone other than T1 to T3 is the same as in other smoothing circuits.

As described above, according to the capacitor input type smoothing circuit 10 of the present invention, the time zone in which electric power is supplied from the power line to the load in the capacitor input type smoothing circuit 10 of the present invention is very long compared with that in the simple capacitor input method. Also from this, it can be said that the power factor has been improved by the present invention. In addition, the above is a basic description of the capacitor input type smoothing circuit according to the present invention.

BRIEF DESCRIPTION OF DRAWINGS

FIG. 3 is a graph showing movements an input voltage, a voltage of a load, and a current of a capacitor in a conventional simple capacitor input smoothing circuit.

FIG. 4 is a graph showing movements of an input voltage, a voltage of a load, and a current of a capacitor in a capacitor input type smoothing circuit according to the present invention.

EXPLANATION OF REFERENCE

Figure 1:
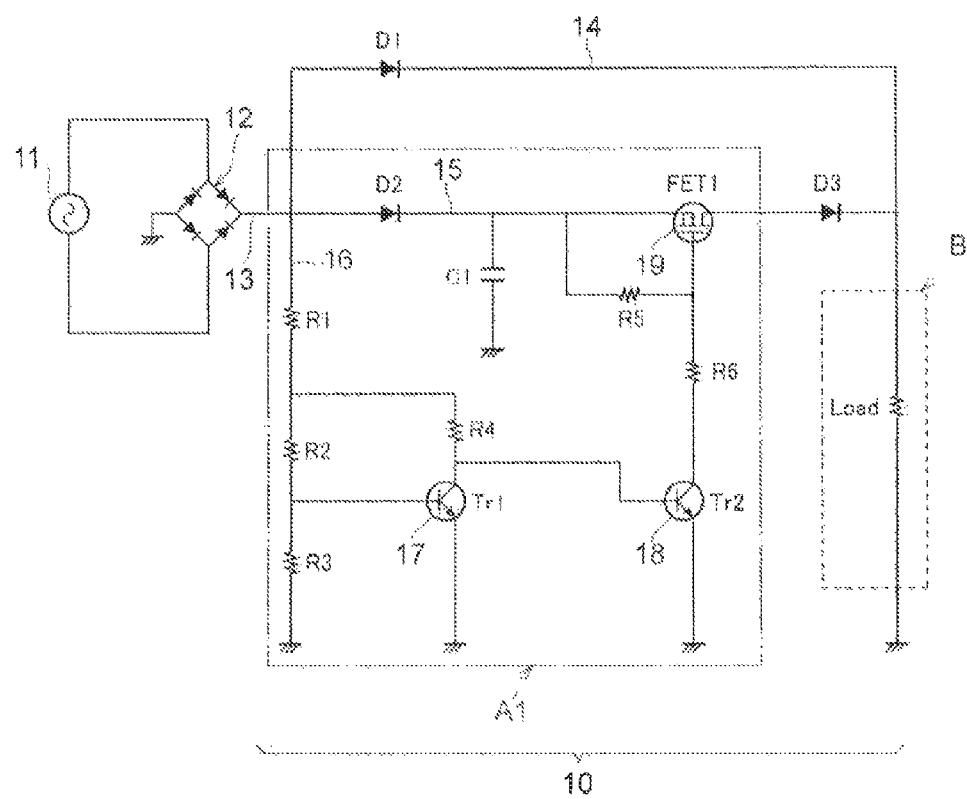
FIG. 1 is a circuit diagram showing example 1 of a capacitor input type smoothing circuit according to the present invention.
Figure 2:
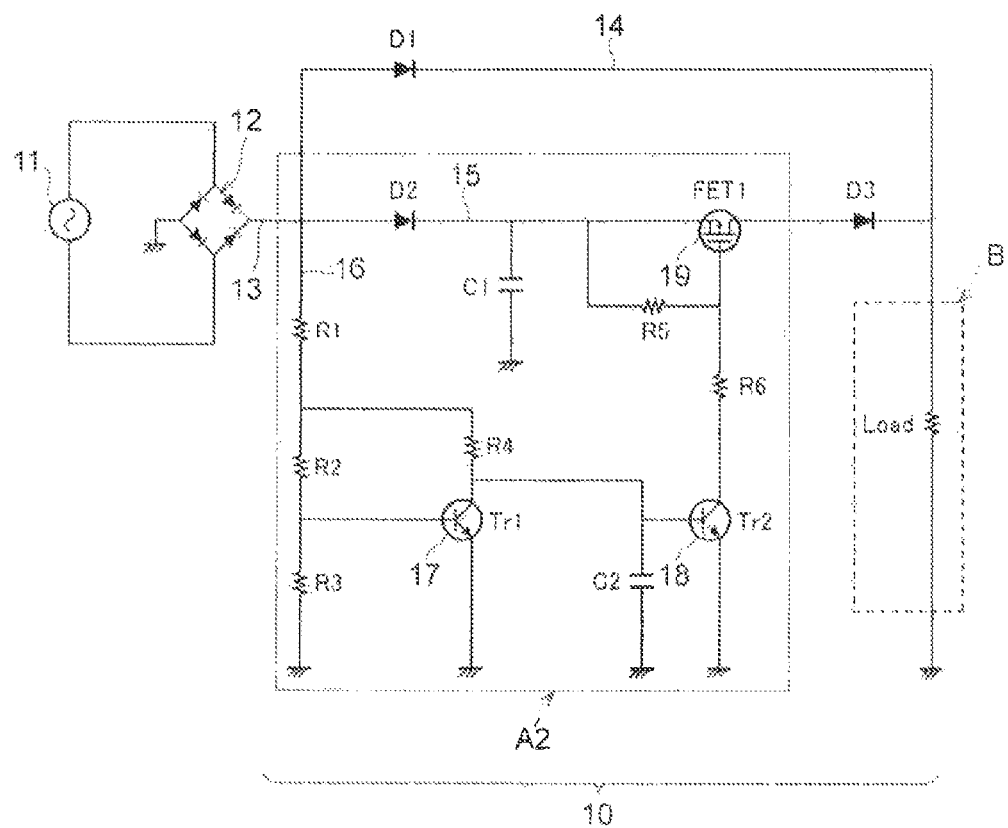
FIG. 2 is a circuit diagram showing example 2 of the capacitor input type smoothing circuit according to the present invention.

10: capacitor input type smoothing circuit
11: AC power supply
12: bridge circuit
13: power line
14: pulsating circuit
15: capacitor input circuit (smoothing circuit)
16: voltage detection circuit
17: first switch
18: second switch
19: third switch
A1, A2: control circuit
B: load
C1, C2: capacitor
D1, D2, D3: diode
FET1: field effect transistor
R1, R2, R3, R4, R5, R6: resistor
Tr1, Tr2: transistor

The invention claimed is:

1. A capacitor input type smoothing circuit, comprising:
   a pulsating circuit that supplies a pulsating voltage to a load when a capacitor is not discharged; and
   a control circuit that controls discharging of the capacitor,
   wherein the control circuit includes a smoothing circuit, which is connected in parallel to the pulsating circuit, and a voltage detection circuit for detecting a voltage,
   the voltage detection circuit determines a voltage range to discharge the capacitor, and includes a first switch that is turned off by detecting that the pulsating voltage is in the voltage range, a second switch that is connected to the first switch and is turned on when the first switch is turned off, and a third switch that is connected to the second switch and is turned on when the second switch is turned on,
   when the pulsating voltage is not in a discharge voltage range of the capacitor, the first switch is turned on and the second and third switches are turned off so that capacitor power is not supplied to the load, and
   a discharge voltage of the capacitor is set within a range that is higher than a lower limit of a voltage that the load requires and is not equal to or greater than the voltage.

2. A capacitor input type smoothing circuit for smoothing a pulsating current generated when converting AC current to DC current, comprising;
   a bridge circuit connected to an AC power supply; and
   a power line connected to an output end of the bridge circuit,
   wherein the power line is branched into three lines leading to a pulsating circuit that supplies rectified electric power directly to a load, a capacitor input circuit, and a voltage detection circuit,
   a first branch line is used to supply electric power directly to the load when the capacitor is not discharged,
   a second branch line is used to supply electric power to the capacitor when a supplied pulsating voltage rises so that the capacitor is charged,
   a third branch line is used to divide the supplied pulsating voltage and supply the divided voltage to the voltage detection circuit,
   a backflow prevention element is disposed in the first branch line leading to the load and the second branch line leading to the capacitor, and the voltage detection circuit that determines and detects a voltage range to discharge the capacitor is provided in the remaining third branch line,
   the voltage detection circuit determines a voltage range to discharge the capacitor, and includes a first switch that is turned off by detecting that the pulsating voltage is in the voltage range, a second switch that is connected to the first switch and is turned on when the first switch is turned off, and a third switch that is connected to the second switch and is turned on when the second switch is turned on, and a discharge voltage of the capacitor is set so that the pulsating voltage matches an operating base voltage of the first switch.

3. The capacitor input type smoothing circuit according to claim 2, wherein, a capacitor is additionally connected to a collector of the first switch and a base of the second switch in order to hold conduction of the second switch near the pulsating voltage of 0 V.

\* \* \* \* \*